United States Patent [19]

Posnansky

[11] 4,196,721
[45] Apr. 8, 1980

[54] SOLAR HEATED VACUUM FLASK

[76] Inventor: Mario Posnansky, Melchenbuhlweg 18, 3006 Bern, Canton of Berne, Switzerland

[21] Appl. No.: 965,157

[22] Filed: Nov. 30, 1978

[30] Foreign Application Priority Data

Oct. 18, 1978 [CH] Switzerland ............... 10785/78

[51] Int. Cl.$^2$ ............... A47J 41/02; F24J 3/02
[52] U.S. Cl. ............... 126/451; 206/543; 215/13 R; 220/403; 220/420; 220/454; 222/465; 248/311.1 R; 248/455
[58] Field of Search ............... 215/13 R, 13 A, 12 R; 126/270, 271, 451; 220/420, 412, 424, 425, 335, 403, 454; 248/455, 514, 133, 311.1 R; 206/541, 550, 542, 543, 544; 222/465

[56] References Cited

U.S. PATENT DOCUMENTS

| 1,031,884 | 7/1912 | Stilling | 215/13 R X |
|---|---|---|---|
| 1,585,397 | 5/1926 | Loycano | 248/455 |
| 1,760,321 | 5/1930 | Seigheim | 220/420 X |
| 2,624,451 | 1/1953 | Ewing | 220/412 |
| 3,016,159 | 1/1962 | Bramming | 215/13 A |
| 3,272,379 | 9/1966 | Driza et al. | 220/335 |
| 3,363,618 | 1/1968 | Dominguez | 126/270 |
| 3,504,822 | 4/1970 | Haloski | 220/203 |
| 3,915,304 | 10/1975 | Pasco et al. | 220/417 X |
| 3,938,497 | 2/1976 | Andrassy | 126/270 |
| 4,034,926 | 7/1977 | Wegner | 220/335 X |
| 4,054,256 | 10/1977 | Buck, Jr. et al. | 248/96 |
| 4,119,085 | 10/1978 | Knowles | 126/271 |

FOREIGN PATENT DOCUMENTS

2807534 8/1978 Fed. Rep. of Germany ........... 126/271

Primary Examiner—Allan N. Shoap
Attorney, Agent, or Firm—Howard C. Miskin

[57] ABSTRACT

The wall of a protective jacket of a vacuum flask, containing a double-walled vessel whose walls are permeable to solar radiation, includes parts capable of being swung open. These parts and a wall part situated between them each have a reflective coating. The reflective surfaces of these coatings, viewed in cross-section, extend along a parabola when the movable wall parts are opened out, so that incident solar radiation is collected in the core zone of the vessel. A solar-radiation absorbing member may be disposed in this core zone, e.g., a metal tube having a black outer surface. Liquid contents of such a vacuum flask can be heated by means of solar energy.

21 Claims, 13 Drawing Figures

SOLAR HEATED VACUUM FLASK

This invention relates to vacuum flasks, and more particularly to a vacuum flask of the type comprising a vessel having an inner wall and an outer wall, both permeable to solar radiation and bounding a space exhausted of air, and a protective jacket.

In designing such vacuum flasks, it has hitherto been endeavored only to protect the contents of the vessel as well as possible against heat loss or heat absorption. This is indeed the purpose of the space exhausted of air. In certain designs, the inner surface of the outer vessel wall is made reflective in order that the heat loss through reflection may be as low as possible.

It is an object of this invention to provide an improved vacuum flask designed in such a way that the liquid contents thereof can be heated by solar radiation.

To this end, in the vacuum flask according to the present invention, the improvement comprises a protective jacket of which at least one part has a reflective inner surface and is capable of being swung open.

Preferred embodiments of the invention will now be described in detail with reference to the accompanying drawings, in which.

Figure 1:
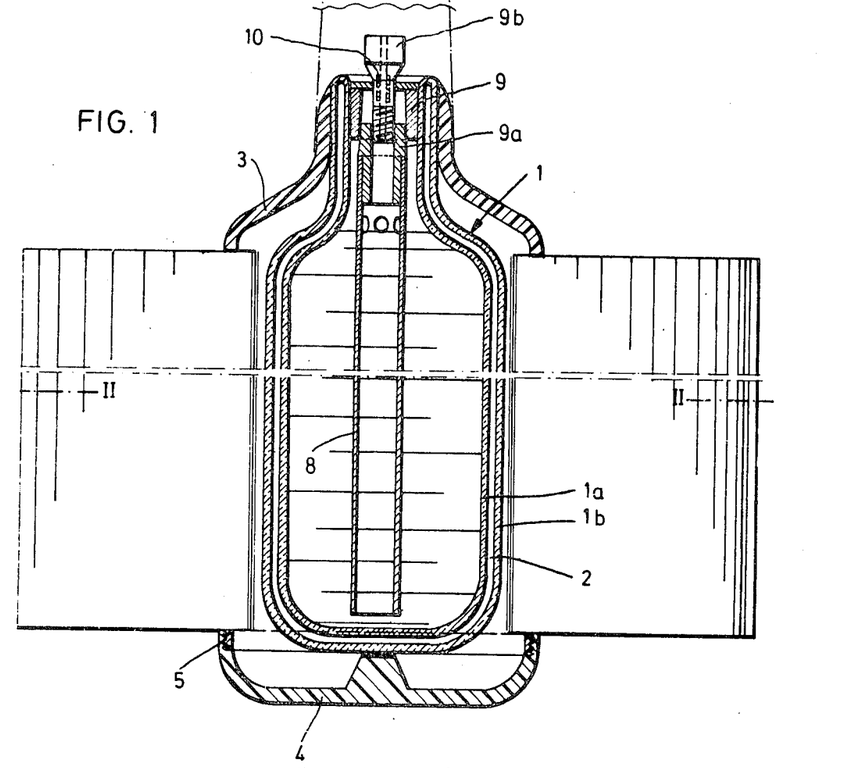
FIG. 1 is a longitudinal section through a first embodiment of the vacuum flask according to the invention.
Figure 2:
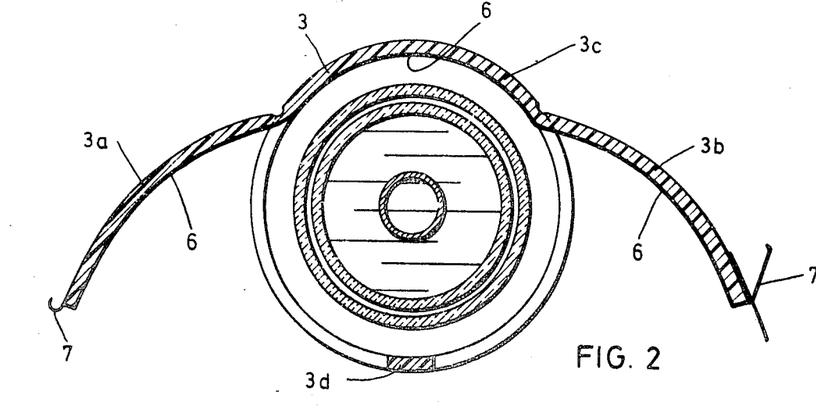
FIG. 2 is a cross-section taken on the line II—II of FIG. 1.
Figure 3:
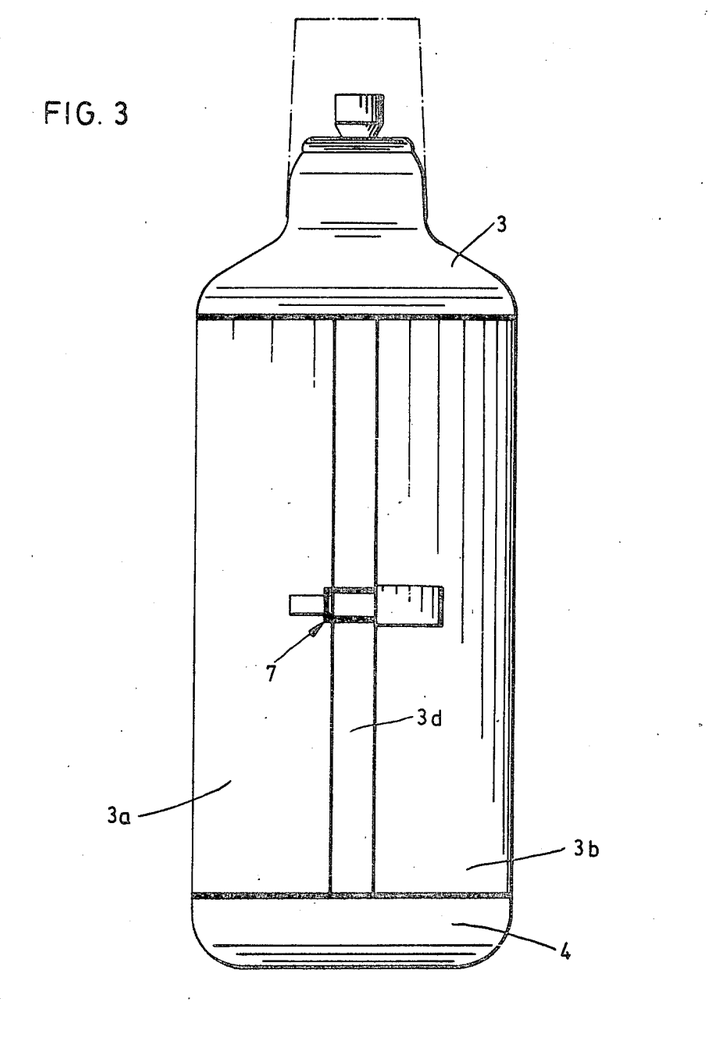
FIG. 3 is an elevation of the first embodiment with protective jacket parts in closed position.

The vacuum flask illustrated in FIGS. 1 and 3 comprises a double-walled vessel 1 having an inner wall 1a and an outer wall 1b, both of which are permeable to solar radiation, a space 2 between walls 1a and 1b being exhausted of air. Vessel 1 is immovably inserted in a protective jacket which may, for example, be made of plastic, and which comprises parts 3 and 4 screwed together at location 5. As may best be seen in FIG. 2, the cylindrical wall portion of the protective jacket, surrounding the cylindrical wall portion of vessel 1, has two wall parts 3a and 3b which can be swung open; these parts 3a and 3b are fairly stiff and are hingedly joined to an intermediate part 3c, opposite which there is a stiff connecting strip 3d. Openable parts 3a and 3b and stationary part 3c are provided on the inside with a reflective coating 6 and thus serve as reflectors which, when wall parts 3a and 3b are opened out into approximately the position shown in FIG. 2, reflect incident solar radiation into the interior of vessel 1. When wall parts 3a and 3b are swung closed and secured in this closed position, e.g., by means of a clasp 7 (FIG. 3), reflective coating 6 also curbs the radiation of heat from vessel 1.

The solar radiation reflected into vessel 1 when wall parts 3a and 3b are opened out is naturally absorbed by a liquid contained in vessel 1 only if it is a dark liquid, such as coffee, for example. In order that other liquids may also be heated by insolation, e.g., ordinary clear water, an additional member 8 which absorbs solar radiation is disposed in the core zone of vessel 1. The outside of member 8 should be a dull black. It may, for example, consist of a fabric sleeve or of a tube slipped over a part 9a of a conventional stopper 9 of vessel 1. Since the vapor-pressure rises within vessel 1 when the liquid contents are heated, care must be taken to ensure that there is an outlet for this pressure. For this purpose, a relief valve 10 is built into an inner part 9b of stopper 9; since such relief valves are in common use, e.g., for pressure cookers, they need not be described in detail here.

As is apparent from FIG. 2, the opened-out wall parts 3a and 3b, together with the intervening wall part 3c, form a rough approximation of a parabolic cylindrical reflector, so that the incident solar radiation is essentially focused on the core zone of vessel 1, where radiation-absorbing member 8 is situated. This cross-sectional view clearly shows the mirror-image arrangement relative to the radial plane running vertically there.

Figure 4:
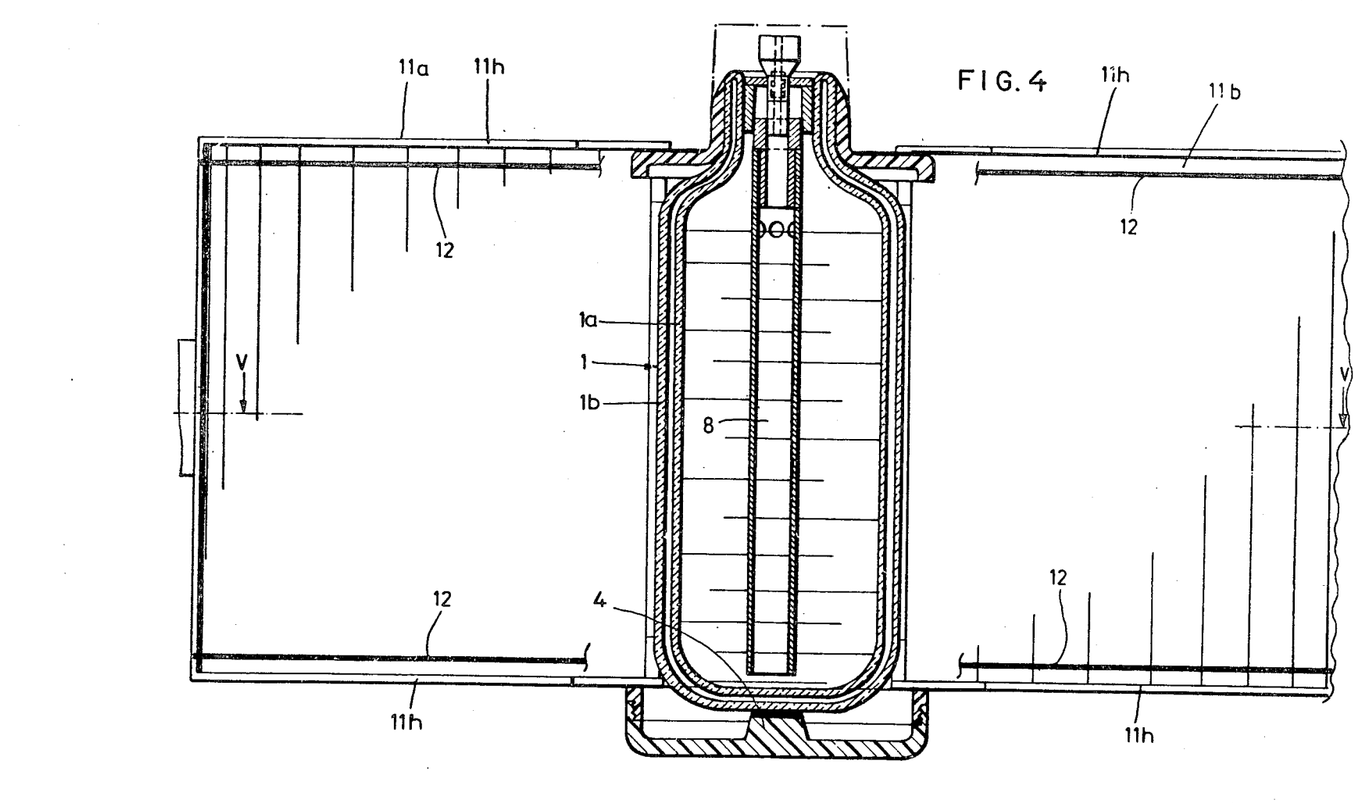
FIG. 4 is a vertical section, similar to FIG. 1, of a second embodiment of the vacuum flask.
Figure 5:
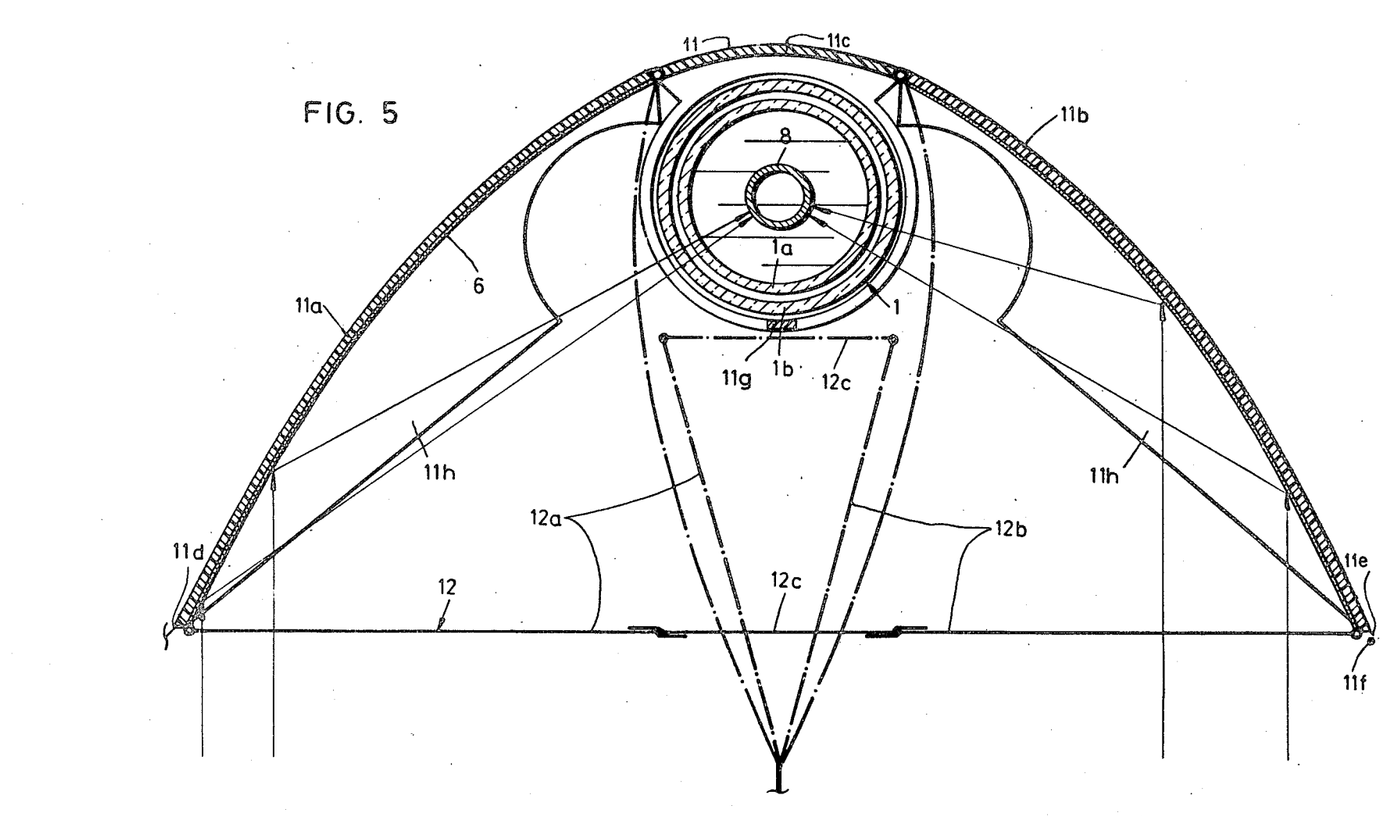
FIG. 5 is a cross-section taken on the line V—V of FIG. 4.
Figure 6:
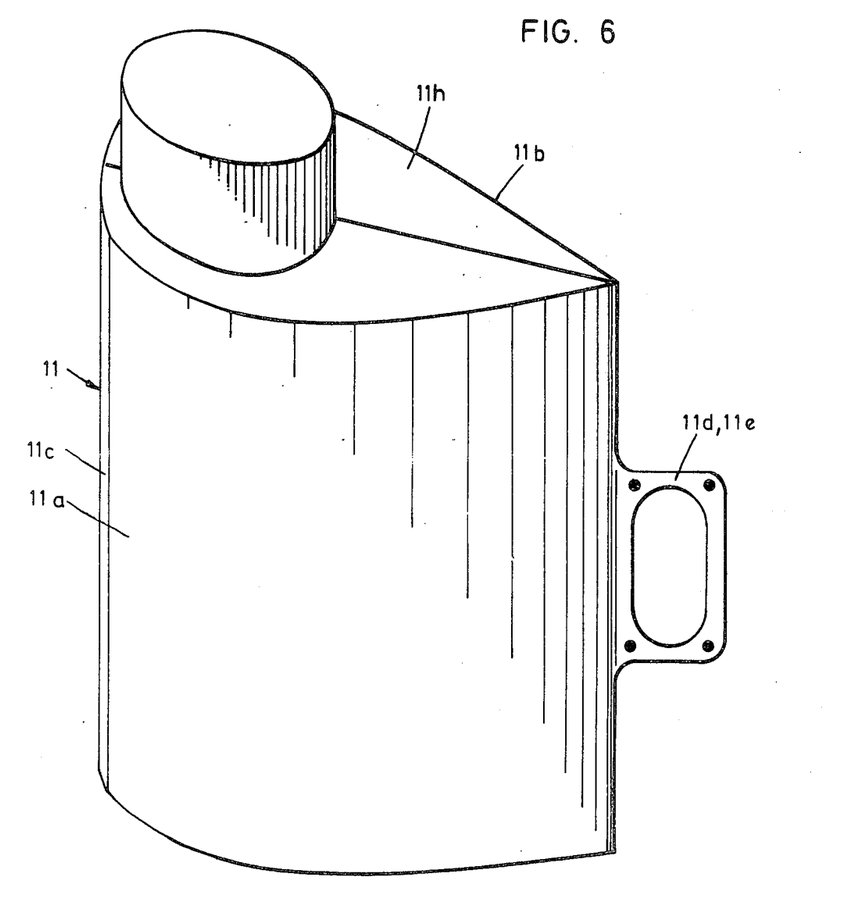
FIG. 6 is a perspective view of a third embodiment of the vacuum flask with protective jacket parts in closed position.

The embodiment of FIGS. 4, 5, and 6 differs from that just described chiefly as regards the design of the portion of the protective jacket having the wall parts which can be swung open; this portion is designated by reference numeral 11, the appurtenant openable wall parts by 11a and 11b each of which includes top and bottom walls 11h, and the wal part situated between the latter by 11c. As may be seen especially from FIG. 5, parts 11a, 11b, and 11c, viewed in cross-section on a plane at right angles to the axis of vessel 1, are shaped in such a way that their reflective coating 6 extends along a parabola when parts 11a and 11b are swung open into the proper position. This position is determined here by two three-piece hinged rod assemblies 12 (FIG. 4), the three parts 12a, 12b, and 12c of one of which are shown in FIG. 5; these parts may be designed similarly to the struts of an umbrella frame, so that when wall parts 11a and 11b are opened out, each of the rod assemblies 12 runs in a straight line, whereas when parts 11a and 11b are closed, rod assemblies 12 occupy the free space next to vessel 1 as shown in dot-dash lines. Fixed to wall parts 11a and 11b are handles 11d and 11e, respectively, handle 11e being provided with projections 11f which snap into matching holes in handle 11d. A jacket strip 11g corresponds to strip 3d of the first embodiment.

It will be seen from FIG. 5 that openable wall parts 11a, 11b, viewed in the cross-section at right angles to the longitudinal axis of vessel 1, have a total length amounting to a multiple of the outside diameter of vessel 1, e.g., three times that diameter. The obvious result is that more solar radiation can be collected and reflected into the core zone of vessel 1, where it is absorbed by member 8, for instance, and transmitted to the surrounding liquid.

Figure 7:
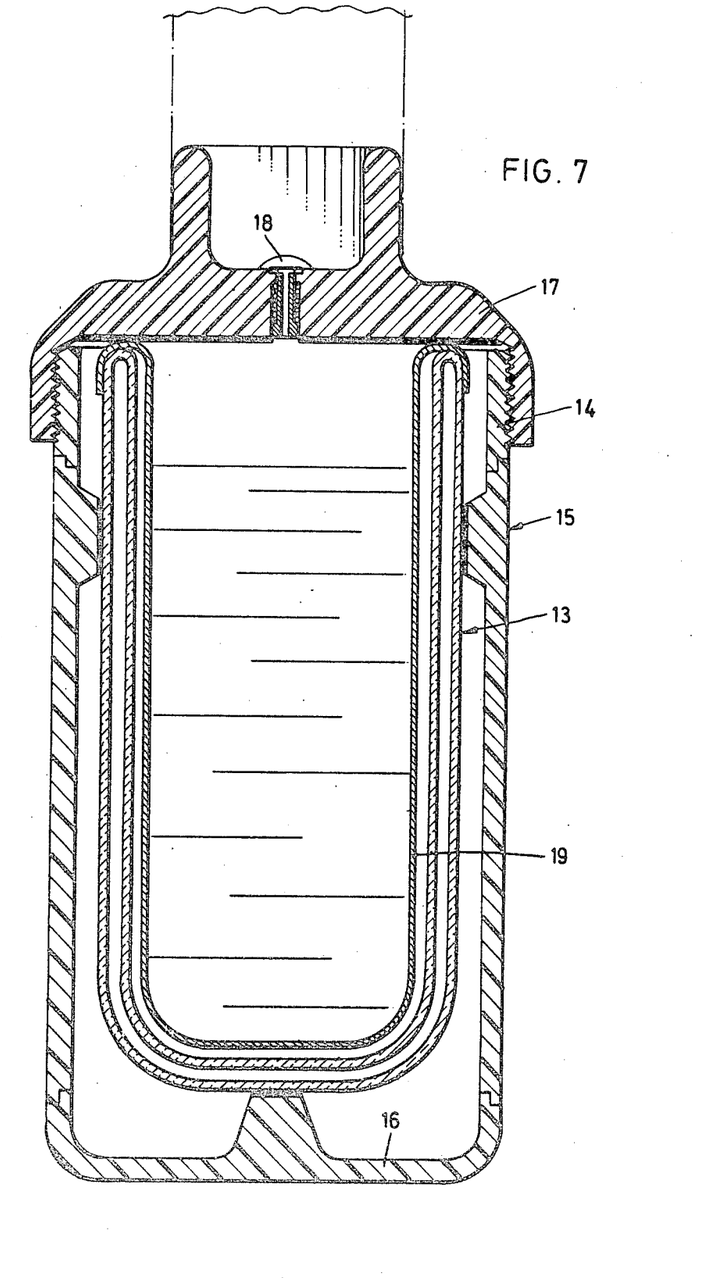
FIG. 7 is a vertical section through this third embodiment.

The embodiment illustrated in FIG. 7 may be designed similarly to one or the other of the foregoing embodiments as regards the form of the openable wall parts of the protective jacket. The difference is that the double-walled vessel, designated here by reference numeral 13, is cylindrical over substantially its entire height. The protective jacket comprises three joined portions 14, 15, and 16, portion 15, which may have a cross-sectional shape according to FIG. 2 or FIG. 5, being provided with the openable wall parts. A closure means in the form of a screw-top 17 is equipped with a relief valve 18. In this embodiment, the radiant-energy absorbing member is a thin-walled metal cup 19 having a doubled-over rim hung on the rim of vessel 13. Cup 19 must obviously have a solar-radiation absorbing outer surface, say, a dull black one.

Figure 8:
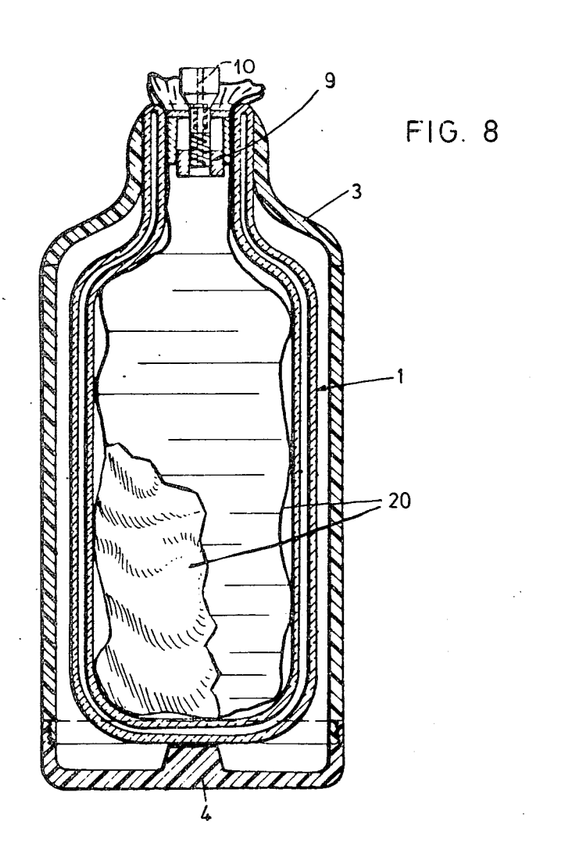
FIGS. 8 and 9 are vertical sections through modified embodiments differing from the first and second embodiments only as regards the design of a member inserted in the vessel for absorbing solar radiation.
Figure 9:
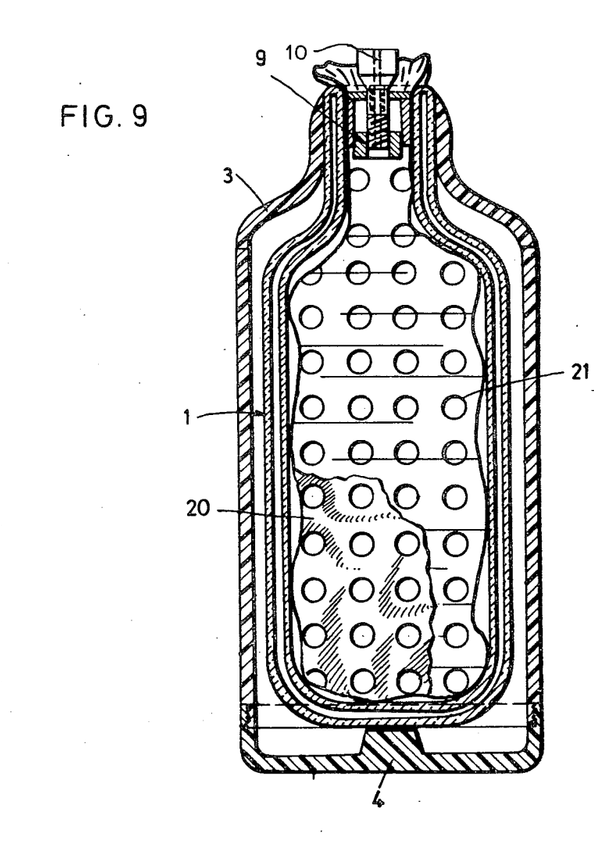

The two modifications illustrated in FIGS. 8 and 9 differ from the embodiment of FIG. 1 (or possibly that of FIGS. 4–6) only as regards the design of the member intended to absorb solar radiation. In the modification shown in FIG. 8, this member takes the form of a fluid-tight bag 20 of flexible material coated on the outside with a solar-radiation absorbent substance. The neck of bag 20 is sealingly clamped between the neck portion of vessel 1 and stopper 9. In the modification shown in FIG. 9, fluid-tight bag 20 is replaced by a perforated bag 21 having a similar solar-radiation absorbent coating on the outside. Bag 20 may be used as a disposable accessory, e.g., when soup or the like is heated therein, whereas bag 21 can be used repeatedly, e.g., when coffee, tea, or plain water, i.e., liquids forming little or no residue, are heated.

Figure 10:
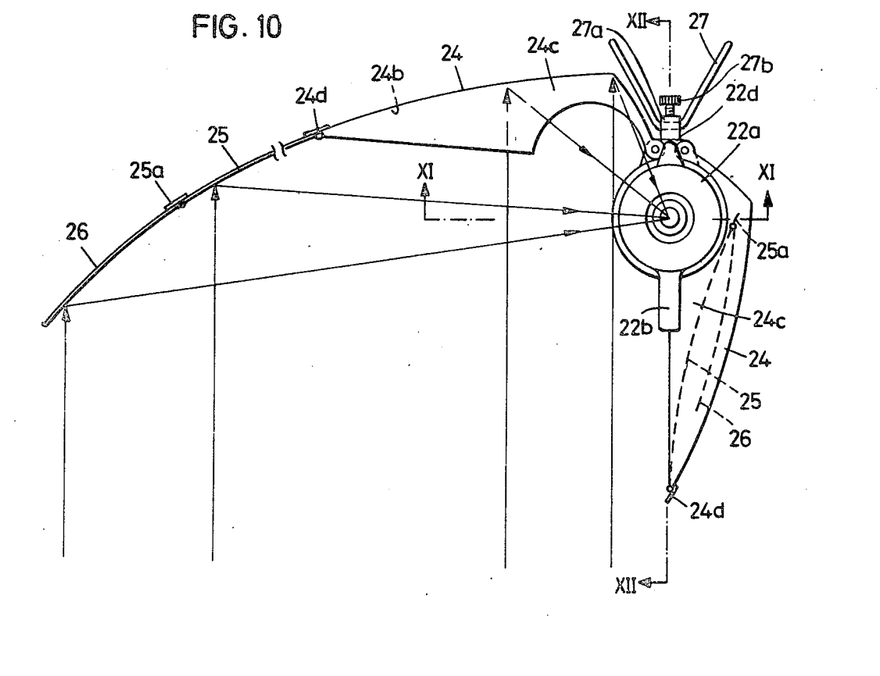
FIG. 10 is a top plan view of a further embodiment, one side of which shows the reflective parts of the protective jacket in the closed position of non-use, while the other side shows the corresponding reflective parts in the opened-out position of use.
Figure 11:
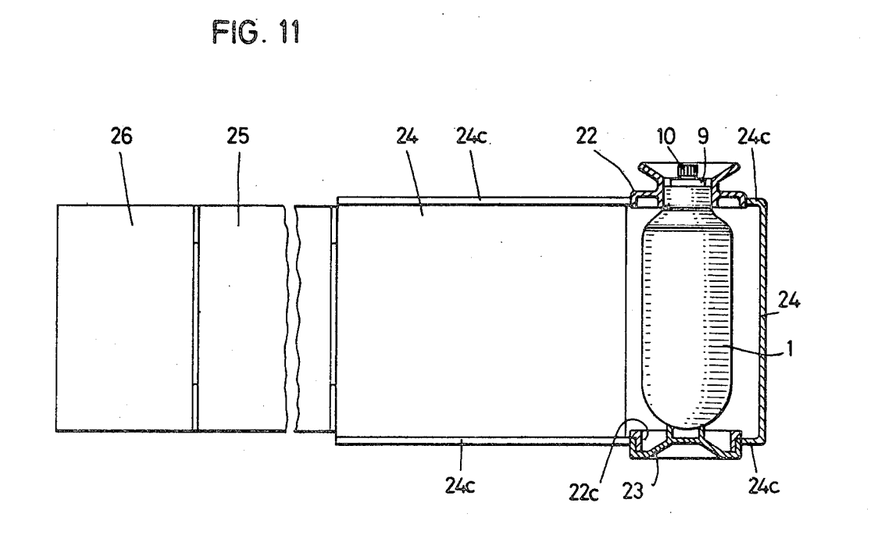
FIG. 11 is a partial longitudinal section taken on the line XI—XI of FIG. 10.
Figure 12:
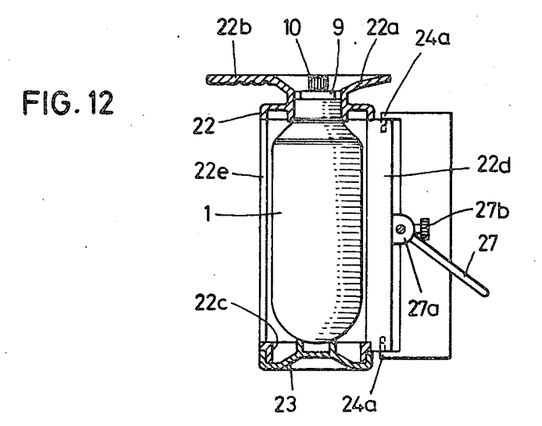
FIG. 12 is a partial longitudinal section taken on the line XII—XII of FIG. 10.

The embodiment illustrated in FIGS. 10–12 also comprises double-walled vessel 1, stopper 9 of which is equipped with relief valve 10, and in which a member absorbing solar radiaton such as 8 or 20 or 21 is inserted (not shown here). The protective jacket, like that of the first embodiment, comprises portions 22 and 23, which may, for example, be injection-molded plastic parts. The top of portion 22 is shaped as a pouring spout 22a and a handle 22b, whereas the bottom thereof takes the form of a ring 22c for receiving portion 23. Connecting strips 22d and 22e are provided on diametrically opposite sides. Pivotingly mounted top and bottom on strip 22d, and symmetrically disposed with respect to the radial plane passing through strips 22d and 22e, are two wall parts 24 which can be opened out. The mounting of these parts may comprise pins which are friction-set or fitted into lugs 24a of wall parts 24 and which engage in blind holes in strip 22d. The cross-sectional shape of wall parts 24 is shown in FIG. 10; in this cross-section, the portion 24b which is not situated in the shade of vessel 1 when in use—cf. the left-hand wall part 24 as viewed in FIG. 10—is substantially part of a parabola having its focal point in the core zone of vessel 1. Portion 24b bears a reflective coating on the inside. At the top and bottom of each wall part 24 there is a flange 24c acting as a stiffening. Hinged to the edge of each wall part 24 remote from the swivel axis is a first additional reflector fin 25, and hinged to the edge of each fin 25 remote from the swivel axis is a second additional reflector fin 26. In the operating position shown on the left-hand side of FIG. 10 (in which position reflector fins 25 and 26 preferably rest against extensions 24d of wall part 24 and 25a of fin 25, respectively), reflector fins 25 and 26 extend, in cross-section, substantially along a continuation of the leg of the parabola on which the reflective surface 24b is situated. It will be obvious that with such a design, solar radiation can be collected in an area of considerably increased width and focussed on vessel 1, i.e., on the core zone thereof. When not in use, wall parts 24 and reflector fins 25, 26 assume the position illustrated at the right-hand side of FIG. 10, in which position additional reflector fins 25 and 26 are accommodated between the closed wall parts 24. In this embodiment, too, means may be used to hold parts 24, or parts 24, 25, 26, spread open. Such means might consist, for example, of upper and/or lower lazy tongs engaging the flanges 24c situated there.

FIGS. 10 and 12 further illustrate adjustable-position supporting means 27 which make it possible in addition to prop the vacuum flask up in a position inclined to the vertical on any desired supporting surface; such supporting means and the mounting thereof might be of the most varied forms and designs. For example, as shown in FIGS. 10 and 12, a bracket 27a is mounted on strip 22d about intermediate the top and bottom thereof, and supporting means 27 in the form of a V-shaped member is swingably supported at its apex by bracket 27a and is releasably fixed in the preselected adjusted position by a thumb screw 27b screw engaging bracket 27a and bearing on the apex of support means 27.

Figure 13:
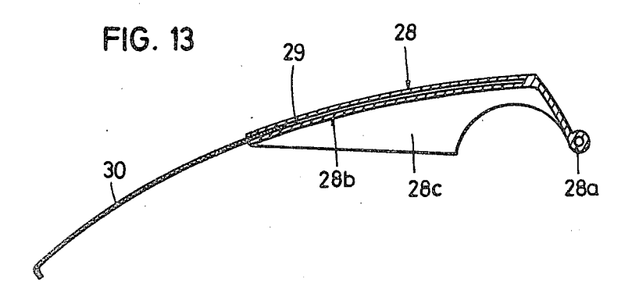
FIG. 13 is a cross-section through a modified embodiment of a protective-jacket part, capable of being swung open and provided with an additional telescopic reflector fin.

FIG. 13 illustrates, as part of a modified embodiment, an openable part 28 of the jacket wall which might be substituted for wall part 24. Wall part 28 (having mounting lugs 28a and flanges 28c corresponding to lugs 24a and flanges 24c, respectively) has a slot space 29 situated behind its reflective inside surface 28b, in which space 29 an additional reflector fin 30 (which, similarly to reflector fins 25, 26, may be made of sheet aluminum, for example) is accommodated. For use, reflector fin 30 can be pulled out into approximately the position shown, in which position it performs the same function as reflector fin 25.

Thus, the invention proposes a vacuum flask design which makes it possible to heat the contents of the flask simply and at no cost by means of solar energy. A vacuum flask of such design has many different possibilities of use, e.g., in the household or forcamping or for workers who take along lunch or snacks. However, larger-scale models of any desired size may be produced for commercial or industrial applications or for heating water or other liquids, e.g., for space-heating installations.

It will be understood that the structural details might be modified in many respects without departing from the basic concept of the invention.

What is claimed is:

1. In a vacuum flask of the type including a vessel having an inner wall and an outer wall, both permeable to solar radiation and bounding a space exhausted of air, and a protective jacket, the improvement which comprises:
    a said protective jacket of which at least one part is capable of being open, said part having an inner surface with reflective means to deflect solar radiation to said vessel to heat the contents thereof when said part is swung open.

2. The vacuum flask of claim 1, wherein said at least one part is a part of a wall of said protective jacket.

3. The vacuum flask of claim 2, wherein said protective jacket comprises two wall parts capable of being swung open about respective swivel axes and each having a reflective inner surface, said wall parts being disposed symmetrically to a plane containing the longitudinal axis of said vacuum flask when said vacuum flask is viewed in cross-section perpendicular to said longitudinal axis.

4. The vacuum flask of claim 3, wherein said protective jacket further comprises a top portion, a bottom portion, and a further wall part secured to said top portion and said bottom portion between said two wall parts, said two wall parts each being hingedly connected to said further wall part, and said further wall part having a reflective inner surface.

5. The vacuum flask of claim 4 wherein when the wall parts are swung open on either side of said further wall part the reflective inner surface of said two wall parts and said further wall part substantially form the legs and an apex portion of a parabola when said vacuum flask is viewed in cross-section perpendicular to the longitudinal axis thereof, the length of said legs being a number of times, preferably approximately three times, the outside diameter of said vessel, and the length of said apex portion being substantially equal to said outside diameter.

6. The vacuum flask of claim 5, further comprising means for holding said two wall parts opened out to a predetermined extent, said means including at least one three-piece collapsible rod assembly having ends joined to said two wall parts, said rod assembly holding said two walls, when opened out, in a position wherein the reflective surfaces thereof substantially form parts of a parabolic cylindrical reflector having a focal point which substantially coincides with the longitudinal axis of said vessel, and said rod assembly being accommodated in a space next to said vessel within said protective jacket when said protective jacket is closed.

7. The vacuum flask of claim 3, wherein said protective jacket further comprises a top portion, a bottom portion, and a further wall part secured to said top portion and said bottom portion between said two wall parts, said two wall parts each being mounted on said further wall part and each including a top reinforcing flange and a bottom reinforcing flange.

8. The vacuum flask of claim 3 or claim 7, further comprising a reflector fin hinged to each of said two wall parts at an edge thereof remote from said respective swivel axes, the reflective surfaces of each said reflector fin and of the associated one of said wall parts substantially forming in operative position sections of one and the same leg of a parabola when viewed in cross-section perpendicular to the longitudinal axis of said vacuum flask.

9. The vacuum flask of claim 8, further comprising an additional reflector fin hinged to each said reflector fin, the reflective surfaces of each said additional reflector fin, of the associated said reflector fin, and of the associated one of said wall parts substantially forming in operative position sections of one and the same leg of a parabola when viewed in cross-section perpendicular to the longitudinal axis of said vacuum flask.

10. The vacuum flask of claim 3 or claim 7, wherein each of said two wall parts includes a slot space, further comprising a reflector fin accommodated in each said slot space when in non-operative position and designed to be pulled almost completely out of said slot space for operative purposes.

11. The vacuum flask of claim 1, further comprising means for holding said at least one part in a non-open position.

12. The vacuum flask of claim 1, further comprising means for holding said at least one part opened out to a predetermined extent.

13. The vacuum flask of claim 1, further comprising removable vessel-closure means including a pressure relief valve.

14. The vacuum flask of claim 1, further comprising a solar-radiation absorbing member disposed within said vessel.

15. The vacuum flask of claim 14, wherein said vessel is cup-shaped, having a uniform cross-section over substantially the entire length thereof, and wherein said solar-radiation absorbing member is a thin-walled metal cup extending over almost the entire length of the interior of said vessel, the outside diameter of said metal cup being only slightly less than the inside diameter of said vessel, and the outer surface of said metal cup being dull black.

16. The vacuum flask of claim 15, wherein said solar-radiation absorbing member is a sleeve or tube having a dull black outer surface.

17. The vacuum flask of claim 16, further comprising removable closure means disposed in the mouth of said vessel, said sleeve or tube being attached to a part of said closure means.

18. The vacuum flask of claim 14, further comprising removable closure means disposed in the mouth of said vessel, wherein said solar-radiation absorbing member is a flexible bag having a dull black outer surface and adapted to fit within the interior of said vessel, said bag having a neck portion clampable between said mouth of said vessel and said closure means.

19. The vacuum flask of claim 18, wherein said bag is fluid-tight.

20. The vacuum flask of claim 18, wherein said bag is perforated except for said neck portion thereof.

21. The vacuum flask of claim 1, wherein said protective jacket is provided with preferably adjustable means for propping said vacuum flask in a position inclined to the vertical.

* * * * *